April 8, 1952  G. P. WISDOM  2,591,990
BEVERAGE CARBONATING DEVICE
Filed Oct. 9, 1948  2 SHEETS—SHEET 1
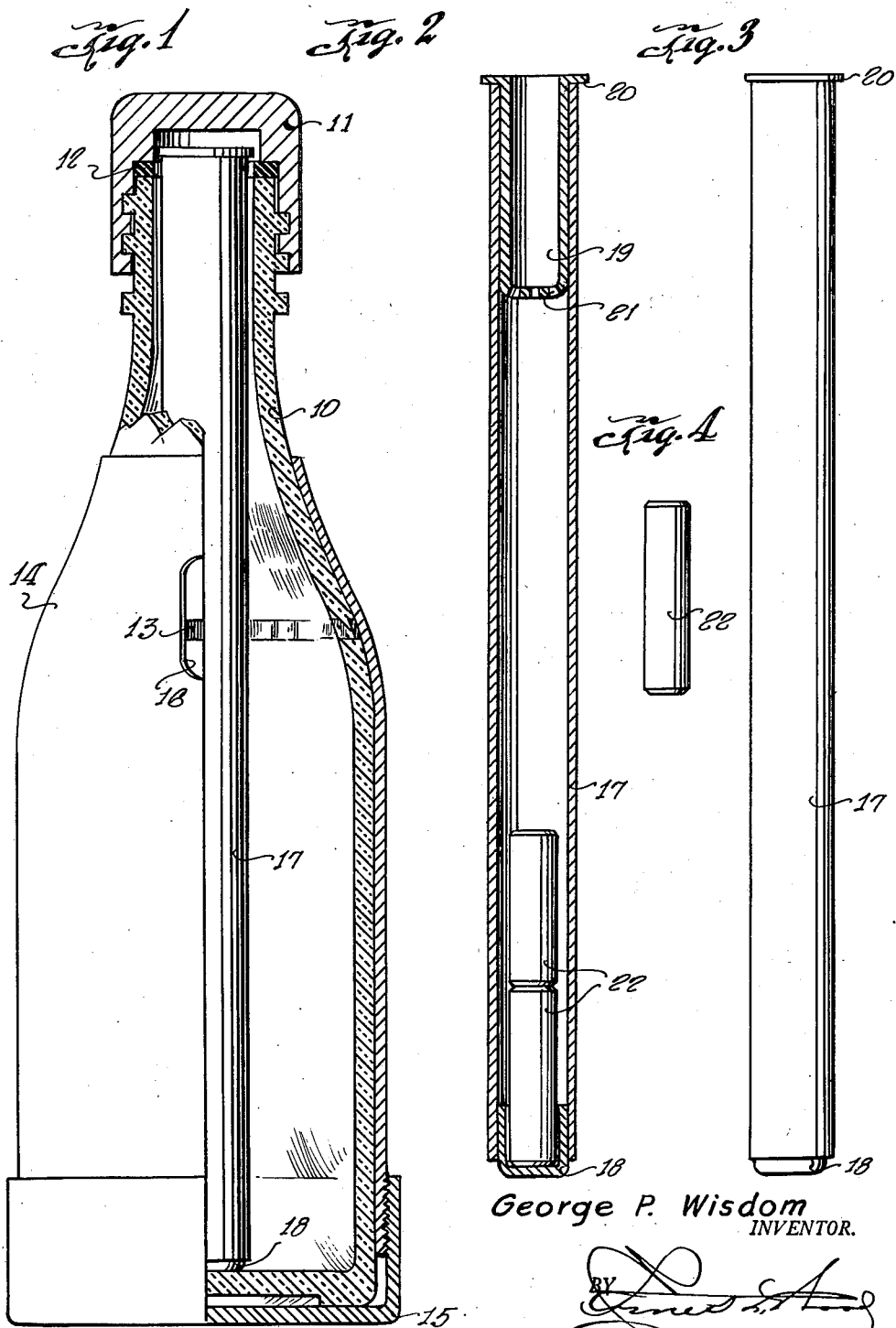
George P. Wisdom
INVENTOR.
ATTORNEY

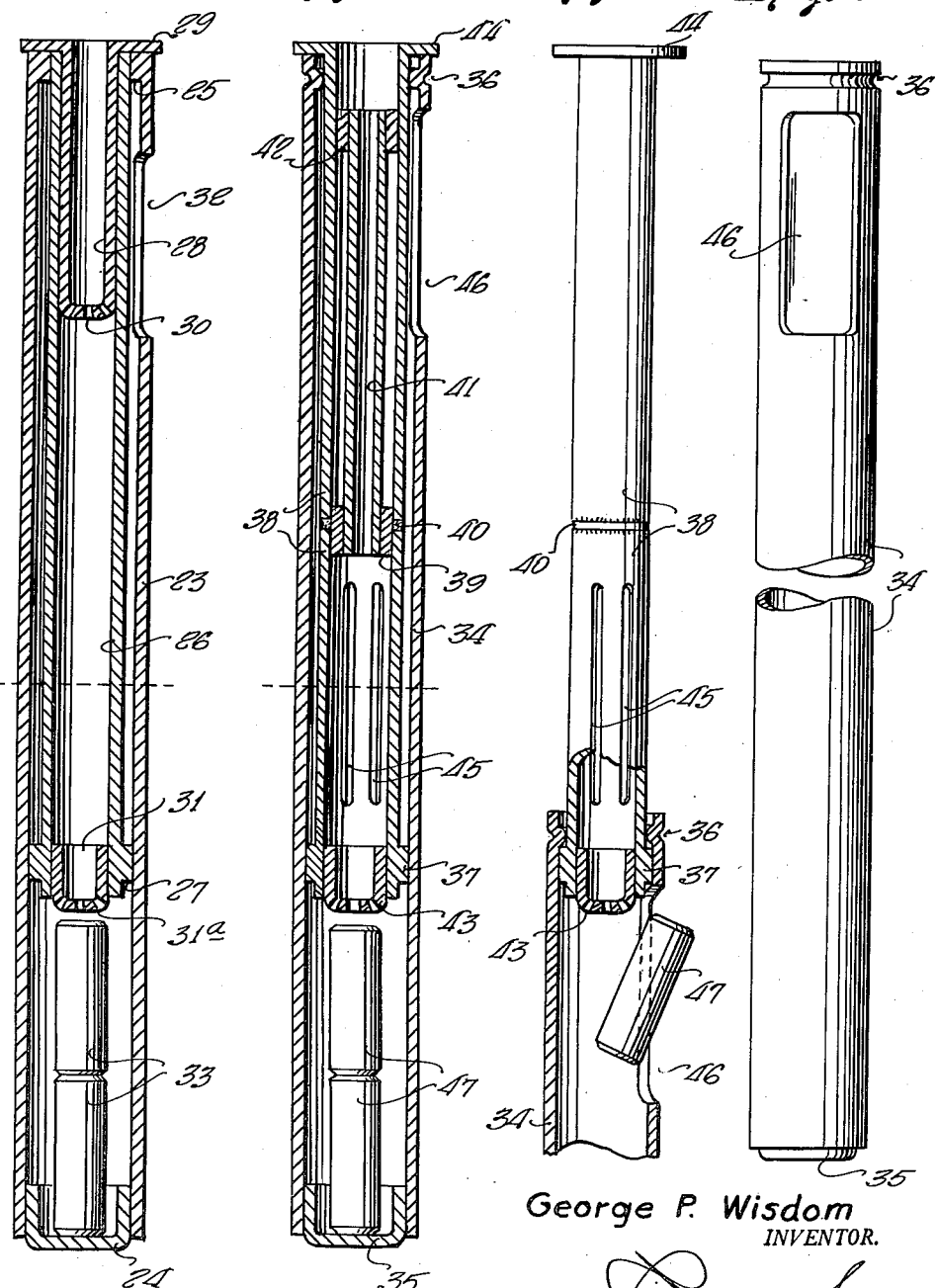

Patented Apr. 8, 1952

2,591,990

UNITED STATES PATENT OFFICE 2,591,990

BEVERAGE CARBONATING DEVICE

George P. Wisdom, Exeter, Mo.

Application October 9, 1948, Serial No. 53,730

5 Claims. (Cl. 261—121)

This invention relates to water carbonating apparatus and it has particular reference to a carbonator especially designed for home use in preparing limited quantities of beverage.

The principal object of the invention is to produce a device of simple and economical construction, which is easy to operate and consumes but a minimum of time in carbonating and producing a highly palatable beverage of any desired nature and flavor. Moreover, the invention provides such a device in which overcarbonation is impossible, due to the provision for the use of $CO_2$ gas producing pellets which are of a predetermined length and volume and when more than the prescribed number of such pellets are placed into the carbon dioxide generator, it will not be possible to close the latter for operation.

Another object of the invention is to provide a water carbonator which is comprised of a beverage vessel having a threaded cap, into which is adapted to be placed a concentric tube assembly consisting of an outer tube and a specially constructed inner tube designed to slide in the outer tube but held against release therefrom. A window is provided in the outer tube for the introduction of gas producing pellets when the inner tube is displaced longitudinally with respect to the outer tube following which, a predetermined quantity of water is placed in the tube assembly. The cap is replaced on the beverage vessel and the latter is put into a refrigerator where the liquid is cooled during carbonation.

With the foregoing objects in view, the invention has further reference to certain features of accomplishment which will become apparent as the description proceeds, taken in connection with the accompanying drawings wherein:

Figure 1 is an elevational view, partly in section, showing the beverage bottle or vessel in a metal container and in which the gas generating tube assembly is disposed.

Figure 2 is a view showing one form of the gas generating tube assembly of the invention in longitudinal section.

Figure 3 is an elevational view of the tube assembly shown in Figures 1 and 2.

Figure 4 is a view of a gas producing pellet per se.

Figure 5 is a longitudinal sectional view of a gas generating tube assembly showing a modified form of the invention.

Figure 6 is a longitudinal sectional view of still another modified form of the invention.

Figure 7 is a fragmentary elevational view of the tube assembly shown in Figure 6, partly in section illustrating the manner in which the inner tube is displaced from the outer tube to deposit gas producing pellets, and Fig. 8 is an elevational view of the outer tube shown in Figure 6.

Continuing with a more detailed description of the drawing, reference is primarily made to Figures 1 to 4 inclusive in which numeral 10 denotes a beverage vessel, preferably a glass bottle or flask having a threaded neck on which is adapted to be threaded a cap 11. A rubber gasket 12 is interposed between the cap and bottle neck to provide a gas and water tight seal. The bottle 10 has a band 13 surrounding the same which may be applied in any suitable manner to indicate the prescribed level of liquid which is to be placed in the bottle.

A housing is provided for the bottle 10 which is made up of a metal or plastic shell 14, shaped to conform to the body of the bottle. This shell is placed on the bottle over the neck thereof and has an exteriorly threaded skirt portion receivable in a correspondingly threaded cup 15 which underlies the bottom of the bottle. The shell 14 has a pair of diametrically opposed windows 16 therein through which may be observed the liquid level indicating band 13.

The carbon dioxide generator shown in Figure 2 consists of an elongated tube 17 which is open at its top and closed at its bottom by means of a plug 18. Both the tube 17 and plug 18 are formed preferably from stainless steel and the plug 18 is held in place as by a shrink or drive fit to avoid soldering or welding. In any case, the plug must form a water tight seal with the tube 17.

An inner tube 19 of the same material is inserted into the open end of the tube 17 and which has an annular flange 20 on its upper end overreaching the upper end of tube 17 and whose open end is concentric with the tube 17. The tube 19 has perforations 21 in its bottom.

In Figure 4 is shown per se a pellet 22 which produces the desired gas and which consists of bicarbonate of sodium and citric acid and these pellets preferably contain a denaturing substance such as quinine sulphate or quassin to render them unpalatable if used directly in a vessel of water. However, when used with the gas generating apparatus provided by the present invention the denaturing substance is not detectable in the beverage which the pellets are used to carbonate.

To operate the device shown in Figures 1 and 2, the tube asembly is removed from the bottle 10 and a predetermined quantity of flavoring syrup is deposited into the bottle, followed by water until the level thereof reaches the indicating band 13. A measured quantity of water is then poured into the tube assembly after which one or two pellets 22, depending upon their individual volume, are deposited into the tube 17 and the tube assembly is immediately placed in the bottle 10 whereupon the cap 11 is screwed tightly in place. The carbonator is then placed in a refrigerator and when chilled, the liquid is also thoroughly carbonated. The dotted line across Figure 5 indicates the amount of gas space in the tube assembly above the water when ready to generate gas. Gas produced from the pellets in the bottom of tube 17 flows upwardly through perforations 21 in the tube 19, thence to the space under the cap 11 and then downwardly between the tube 17 and the inside of the neck of the bottle 10 to the surface of the liquid in the bottle.

Referring now to Figure 5, which shows a modified form of the invention, an elongated outer tube 23 is provided which has an open upper end and whose lower end is closed by a plug 24 which is held in place by shrinking or a drive fit to obviate the necessity for welding or soldering, yet to insure a water tight seal. The material of which the tube and plug are made is preferably stainless steel. The outer tube 23 is provided at its upper end with an internal annular shoulder 25.

Arranged concentrically in the tube 23 and adapted to slide longitudinally therein is an inner tube 26 on whose lower end is formed an external annular shoulder 27. This shoulder cooperates with the shoulder 25 in the top of tube 23 to prevent the tube 26 from being removed from tube 23 when the former is displaced longitudinally in the latter for the purpose to be presently described.

The inner tube 26 has an open upper end into which extends a shorter tube 28, the latter being permanently in place by a shrink or drive fit. The tube 28 has an annular flange 29 about its upper end which bears on the shouldered upper end of tube 23 and its lower end is closed except for perforations 30. The lower end of the inner tube 26 is closed by a plug 31 having perforations 31a therein.

The outer tube 23 has a window 32 near its upper end to receive gas producing pellets 33. These pellets are placed in the tube 23 by raising the inner tube 26 upwardly until the shoulder 27 thereon engages the shoulder 25 of the outer tube 23.

To operate the assembly illustrated in Figure 5, it is withdrawn from the bottle, such as shown in Figure 1 and a measured quantity of flavoring syrup is placed in the bottle, followed by sufficient water to bring the level thereof to the band 13 on the bottle. The tube assembly as it appears in Figure 5, minus the gas producing pellets, is placed in the carbonating bottle, after which a measured quantity of water is poured into the tube assembly and the inner tube 26 is withdrawn from the tube 23 to the extent permitted by the shoulders on the respective tubes; a further upward pull on the tube 25 will then raise the entire tube assembly until the window 32 is brought above the mouth of the bottle, whereupon the prescribed number of pellets 33 are inserted in the tube 23 through the window 32. The entire assembly is then permitted to slide back into the bottle whereupon the cap thereof is screwed tightly in place and the bottle is stored in a refrigerator until chilled. Gas flow from pellets 33 in the bottom of tube 23 is upward through perforations 31a in plug 31, thence upward through the perforations 30 in the bottom of tube 28, thence to the space under cap 11 and finally downwardly between tube 23 and inside of bottle neck to its surface of the liquid, after which the beverage, now thoroughly carbonated and ready for consumption, is decanted into drinking glasses.

Referring now to Figures 6 to 8 inclusive wherein is shown yet another modified form of the invention, reference numeral 34 denotes an elongated outer tube whose lower end is closed by a plug 35 and is provided at its upper end with an annular internal bead 36, serving as a movement limiting stop for a shoulder 37 on the bottom of an inner tube 38, slidable longitudinally within tube 34. The tube 38 is made up in two longitudinally aligned sections joined together by a bushing 39. The ends of the sections are slightly spaced apart midway of the ends of the bushing 39 in order to provide a space to receive solder 40, by which the sections and bushing are secured permanently together.

Arranged concentrically within the inner tube 38 is a smaller tube 41, whose lower end is press fitted into the bushing 39 and has on its upper end a similar bushing 42 which latter is sweated to the inner tube 38 and thereby permanently secured. The lower end of the inner tube 38 is closed by a perforated plug 43 while on its upper end is formed an external annular flange 44 which, when the tube 38 is retracted, rests on the upper end of tube 34. Moreover, the lower section of tube 38 is provided with circumferentially spaced, longitudinal slots 45.

To operate the carbonator last described, the carbonator bottle 10 is filled to the band 13 with water and a measured quantity of flavoring syrup. The tube assembly as it appears in Figure 6, minus the gas producing pellets, is placed in the carbonator bottle, after which sufficient water is poured into the top of tube 38 and which water will run down through the innermost tube 41 and into tube 34 through the perforated plug 43. The air in the tubes which is displaced by the water will rise through the slots 45 in tube 38 and upward in the annular space between the tubes 38 and 34 and out through a window 46 in the top of the latter tube.

The flange 44 on the top of tube 38 is grasped with the fingers and the tube 38 is lifted until further upward movement is stopped by engagement of the shoulder 37 on tube 38 with the internal bead 36 on the top of tube 34, as exemplified in Figure 7. Further upward pull on tube 38 will raise the entire tube assembly until the window 46 is brought about the mouth of the bottle, whereupon the prescribed number of pellets 47 are inserted into tube 34 through its window 46. The entire tube assembly is permitted to slide back into the bottle and the screw cap thereof is replaced. The carbonator is then stored in a refrigerator to chill. The gas flow from pellets 47 in the bottom of tube 34 is upward through perforations in plug 43, thence a part of the gas flows out of tube 38 through slots 45 into the space between tubes 34 and 48 and thence upwardly to window 46. The remainder of the gas flows upwardly through tube 41 to the space inside of cap 11 and then downwardly between tube 34 and inside the bottle neck, joining gas from window 46 and flowing to the top of liquid in the bottle. After cooling, the beverage, charged in the manner described, is ready for consumption.

It is obvious that in the form of invention illustrated in Figures 5 and 8 inclusive, it is possible to insert but two gas pellets into the tube assembly and yet permit the tubes to assume their proper relationship in the assembly. In this manner overcharging the carbonator with gas is obviated, hence precluding the possibility of increasing pressure in the bottle to a dangerous point.

The inner tube and associated perforated plugs in each of the various forms of the invention described, are designed to break up large bubbles of gas that tend to form and travel upwardly inside of the tubes when the tube assembly is under atmospheric pressure before the cap of the carbonating bottle is screwed into place. Once pressure develops in the bottle, this action ceases.

Manifestly the construction as shown and described is capable of some modification and such modification as may be construed to fall within the scope and meaning of the appended claims is also considered to be within the spirit and intent of the invention.

What is claimed is:

1. A carbon dioxide gas generator adapted for insertion into a beverage bottle having a neck provided with a closure cap, said generator comprising an assembly of concentrically related tubes adapted to be situated in said bottle, the outer tube of said assembly extending axially from the bottom of said bottle into the neck thereof and defining an annular space between said outer tube and said bottle neck, an inner tube of said assembly being materially shorter than said outer tube and having a flange overreaching the upper end of said outer tube and spaced below said bottle cap to define a space between said cap and flange, the tubes of said assembly being relatively displaceable to admit into the outer tube of the assembly $CO_2$ gas producing pellets and means in said inner tube for diffusing said gas during its upward travel in said tube assembly preliminary to its passage through the spaces between said assembly and bottle cap and neck to carbonate the beverage in said bottle.

2. A carbon dioxide gas generator adapted for insertion into a bottle having a neck and a closure cap, a tube assembly removably disposed in said bottle, said assembly consisting of an outer tube extending from the bottom into the neck of said bottle and adapted to receive water soluble, $CO_2$ gas producing pellets, an inner tube fitting snugly into the upper end of said outer tube of a length less than that of the outer tube and adapted to confine the pellets in said outer tube, an annular flange on said inner tube disposed on the top of said outer tube and spaced below said bottle cap, and means in said inner tube for diffusing gas rising from said pellets in its course from said tube assembly into said bottle through the space between said flange and cap to commingle with and carbonate beverage contained in said bottle.

3. A carbon dioxide gas generator adapted for insertion into a beverage container having a restricted mouth provided with a closure, a tube assembly consisting of an elongated outer tube extending from the bottom to a point adjacent the top of said container and whose upper end is adapted to be concentric with the mouth of said container but defining an annular space between the same and said container mouth, an inner tube fitting snugly into said outer tube and displaceable longitudinally in said outer tube for the reception by the latter of $CO_2$ gas producing pellets, and means in said tube assembly for diffusing gas in its upward course through said tube assembly, preliminary to its passage into the space between said container mouth and tube assembly to carbonate beverage in said container.

4. A beverage carbonator adapted for insertion into a bottle having a restricted neck and a closure cap, a tube assembly consisting of a plurality of concentrically related tubes disposable in beverage contained in said bottle, the outer of said tubes having its lower end resting on the bottom of said bottle and extending into the neck thereof to define an annular space between said outer tube and neck, said outer tube being adapted to receive water soluble $CO_2$ gas producing pellets to be held therein by the restraining influence of an inner tube of said assembly during dissolution of said pellets, a flange on said inner tube holding the latter against downward displacement in said outer tube and means within said tube assembly for diffusing gas escaping from the latter into said bottle through said annular space to carbonate the beverage in said bottle.

5. A carbonator comprising a bottle having a closure cap, a plurality of concentrically related and longitudinally displaceable tubes removably disposed in said bottle and partially submerged in beverage contained therein, the outer of said tubes extending axially from the bottom of said bottle into the neck thereof and adapted to receive $CO_2$ gas producing pellets, an inner tube of said assembly fitting snugly into the upper end of said outer tube and restraining said pellets during dissolution thereof, means for admitting gas from said tube assembly into said bottle to carbonate the beverage therein and means in said tube assembly for diffusing the gas in its passage into said bottle.

GEORGE P. WISDOM.

REFERENCES CITED

The following references are of record in the file of this patent:

UNITED STATES PATENTS

| Number | Name | Date |
|---|---|---|
| 334,159 | Beretz | Jan. 12, 1886 |
| 623,997 | D'Orbessau | May 2, 1899 |
| 732,203 | Lowry | June 3, 1903 |
| 1,712,701 | Hassensall | May 14, 1929 |